US010296691B2

(12) United States Patent
Franch et al.

(10) Patent No.: US 10,296,691 B2
(45) Date of Patent: May 21, 2019

(54) OPTIMIZING THE LAYOUT OF CIRCUITS BASED ON MULTIPLE DESIGN CONSTRAINTS

(71) Applicant: International Business Machines Corporation

(72) Inventors: Robert Louis Franch, Wappingers Falls, NY (US); George Diedrich Gristede, Katonah, NY (US); Matthew Mantell Ziegler, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/191,651

(22) Filed: Jun. 24, 2016

(65) Prior Publication Data

US 2017/0371983 A1    Dec. 28, 2017

(51) Int. Cl.
*G06F 17/50* (2006.01)

(52) U.S. Cl.
CPC ........ *G06F 17/505* (2013.01); *G06F 2217/78* (2013.01); *G06F 2217/84* (2013.01)

(58) Field of Classification Search
CPC .. G06F 17/5077; G06F 17/50; G06F 17/5081; G06F 17/5031; G06F 2217/84; G06F 17/5072; G06F 17/5009; G06F 17/504; G06F 17/5045; G06F 17/505;
(Continued)

(56) References Cited

U.S. PATENT DOCUMENTS

| | | |
|---|---|---|
| 6,311,146 B1 | 10/2001 | Hao et al. |
| 6,591,407 B1 * | 7/2003 | Kaufman ............. G06F 17/505 716/114 |
| 6,910,199 B2 | 6/2005 | Sachs |
| 7,096,443 B2 | 8/2006 | Berthold et al. |
| 7,739,641 B1 | 6/2010 | Barnes |

(Continued)

OTHER PUBLICATIONS

Huang, K., et al., "Highest frequency optimization of VLSI by a novel clock skew scheduling scheme", Proceedings of the International Conference on Automatic Control and Artificial Intelligence, Mar. 3-5, 2012, pp. 1-5.

(Continued)

*Primary Examiner* — Binh C Tat
(74) *Attorney, Agent, or Firm* — Fleit Gibbons Gutman Bongini Bianco PL; Jon A. Gibbons

(57) ABSTRACT

Disclosed is a system, computer program product, and method for performing logic, physical synthesis, and post-route optimization. The method begins with identifying a plurality of groups of paths in a circuit by a unique criteria. The unique criteria is any one of a netlist regular expression, a cell topology regular expression, a physical structure, or a combination thereof. An optimization process is performed on the design and is repeated until the cumulative histogram corresponds to the reference histogram within a threshold. The histogram optimization on the group of paths to make the cumulative histogram correspond to the reference cumulative histogram can be adjusted to account for timing, power, yield, or a combination thereof. After a first group of paths has been optimized, the process can be repeated for other groups of paths. The histogram optimization performed on each group of paths is merged into overall histogram optimization design.

18 Claims, 8 Drawing Sheets

(58) Field of Classification Search
CPC ............. G06F 17/5054; G06F 17/5068; G06F 2217/06; G06F 9/03; H01L 2924/00; H01L 23/5225
USPC .................................................. 716/100–110
See application file for complete search history.

(56) References Cited

U.S. PATENT DOCUMENTS

| | | | |
|---|---|---|---|
| 8,984,464 B1* | 3/2015 | Mihal ................. | G06F 17/5072 716/118 |
| 2006/0031795 A1* | 2/2006 | Rahmat ............... | G06F 17/5081 716/111 |
| 2008/0276210 A1* | 11/2008 | Albrecht ............. | G06F 17/5031 716/113 |
| 2009/0055780 A1* | 2/2009 | Acar ................... | G06F 17/5031 716/132 |
| 2016/0117421 A1 | 4/2016 | Antony et al. | |

OTHER PUBLICATIONS

Shaik, I., et al., "Circuit Design for Low Overhead Delay-Fault BIST Using Constrained Quadratic 0-1 Programming", Proceedings of the 13th IEEE VLSI Test Symposium, Apr. 30-May 3, 1995, pp. 1-7.

Schliebusch, O., et al., "A Framework for Automated and Optimized ASIP Implementation Supporting Multiple Hardware Description Languages", Proceedings of the 2005 Asian and South Pacific Design Automation Conference, Jan. 18-31, 2005, pp. 1-6.

Park, J., et al., "A Fast, Accurate and Simple Critical Path Monitor for Improving Energy-Delay Product in DVS Systems", Proceedings of the 17th IEEE/ACM international symposium on low-power electronics and design, Aug. 1-3, 2011, pp. 1-6.

Zeng, J., et al., "Scan Based Speed-Path Debug for a Microprocessor", Proceedings of the 15th IEEE European Test Symposium, May 24-28, 2010, pp. 1-6.

* cited by examiner

OPTIMIZING THE LAYOUT OF CIRCUITS BASED ON MULTIPLE DESIGN CONSTRAINTS

BACKGROUND OF THE INVENTION

The present disclosure generally relates to the field of integrated circuit design, and more particularly relates to the layout of electrical paths in integrated circuits.

Integrated circuit devices, commonly known as chips, continue to become more powerful and complex as semiconductor manufacturing technologies have advanced. Whereas early integrated circuit devices included fewer than one hundred transistors, it is now common to integrate hundreds of millions of transistors into a single integrated circuit device. This increased transistor count enables some operations that once required several integrated circuit devices to now be implemented in a single integrated circuit device, often providing greater performance at a lower cost. For example, where previously a data processing system might require separate integrated circuit devices for a microprocessor, a memory, a bus interface, and a memory controller, advances in chip density now permit all of these functions to be integrated into the same integrated circuit device. Such devices are typically known as "systems on a chip" due to the high level of integration they provide.

Increases in chip density have also significantly affected the design methodologies used for integrated circuit chips. Rather than manually laying out individual transistors or logic gates in a design to obtain a desired logic function, typically the functional aspects of the design process are separated from the physical aspects. The functional aspects of a design are typically addressed via a process known as a logic design, which results in the generation of a functional definition of a circuit design, typically defined in a hardware description language (HDL) such as VHDL or Verilog. An HDL representation of a circuit is analogous in many respects to a software program, as the HDL representation generally defines the logic or functions to be performed by a circuit design.

In order to improve the automation of synthesized blocks in high-performance microprocessor designs, synthesis may be focused on single large, flat, high performance blocks. The high-performance nature of these designs can make physical synthesis challenging in terms of specific regions of a synthesized logic circuit experiencing characteristics such as congestion, power consumption, timing issues, and the like.

Current integrated circuit design, analysis and optimization tools typically consider only a single timing threshold target for timing analysis and optimization. This provides only a limited view of timing versus power versus yield tradeoffs for integrated circuit design.

More over current integrated circuit design often use a single design criteria for the entire circuit.

SUMMARY OF THE INVENTION

Disclosed is a system, computer program product, and method for performing logic and physical synthesis as well as post-route optimization. The method begins with identifying a plurality of groups of paths in a circuit by a unique criteria. The unique criteria is any one of a netlist regular expression, a cell topology regular expression, a physical structure, or a combination thereof.

In one example the unique criteria includes timing criteria with timing violations counts, timing endpoint reports, and timing histogram analysis attributed to gates in each group of paths in order to provide both a relative power contribution of each group of paths and a delta in power before and after adjusting the histogram optimization.

In another example the unique criteria includes yield criteria with a conversion of the timing histogram to a yield metric attributed to gates in each group of paths in order to provide both a relative power contribution of each group of paths and a delta in power before and after adjusting the histogram optimization.

In still another example the unique criteria includes power criteria with a summation of gate leakage and dynamic power attributed to gates in each group of paths in order to provide both a relative power contribution of each group of paths and a delta in power before and after adjusting the histogram optimization.

Next, the method continues with selecting at least one group of paths from the plurality of groups of paths for analysis. A cumulative histogram is generated for the group of paths that have been selected. The cumulative histogram reference is compared to the cumulative histogram. A histogram optimization on the group of paths is adjusted to make the cumulative histogram correspond to the reference cumulative histogram.

The process is repeated until the cumulative histogram corresponds to the reference histogram within a threshold. The histogram optimization on the group of paths to make the cumulative histogram correspond to the reference cumulative histogram is adjusted to account for timing, power, yield, or a combination thereof.

After a first group of paths has been optimized, the process can be repeated for other groups of paths selecting an additional group of paths from the plurality of the groups of paths for analysis and performing steps above. The histogram optimization performed on each group of paths is merged into overall histogram optimization design. In addition, cumulative violations across all groups of paths in the plurality of groups of paths can be optimized.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

In one example, the present invention provides a mechanism for co-optimizing timing versus power versus yield by using a reference histogram as the timing target, rather than a single timing threshold.

The mechanism is based off a reference slack histogram as a optimization target.

Optimization algorithms during histogram optimization attempt to convert the macro histogram to reference histogram. Unique optimizations can be applied to each type of path groups in a circuit design contains multiple types of paths within a single integrated circuit.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

Figure 10:
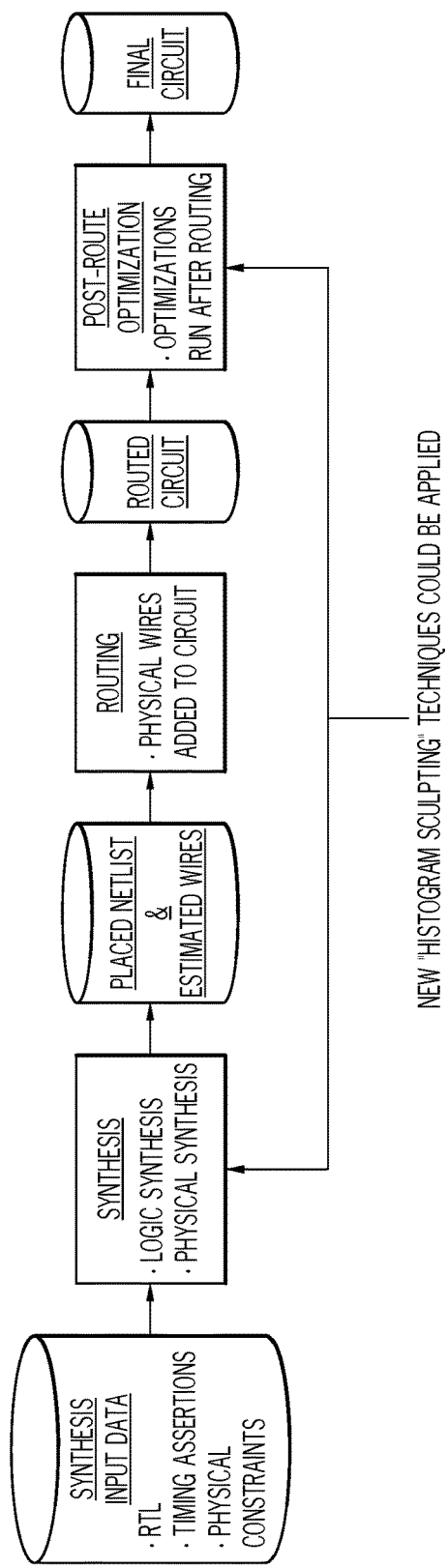
FIG. 10 is functional diagram showing the present invention can be applied in various stages of histogram optimization design.

The term "histogram optimization" is used to mean an optimization process that could occur either in the synthesis or post-route steps of a design flow that performs the specific timing/power/yield tradeoffs. There are multiple places in the design flow in which histogram optimization may be performed: 1) within synthesis, a broader term that includes logic and physical synthesis, or 2) post-route optimization. This is shown in FIG. 10.

The term "synthesis" is an umbrella term that implies both logic and physical synthesis. For physical synthesis, gate placement and additional optimization would be performed by the physical synthesis step. The logic aspect of synthesis is called logic synthesis which is in electronics is used for the a process by which an abstract form of desired circuit behavior, typically at register transfer level (RTL), is turned into a design implementation in terms of logic gates, typically by a computer program called a synthesis tool. Common examples of this process include synthesis of HDLs, including VHDL and Verilog. Some synthesis tools generate bitstreams for programmable logic devices such as PALs or FPGAs, while others target the creation of ASICs. Logic synthesis is one aspect of electronic design automation.

The term "macro histogram" is used to refer to a cumulative histogram that is generated for a select group of paths.

The term "path group" means a sub-set of paths.

The term "reference cumulative histogram" or "ideal histogram" means a histogram comparing cumulative path count versus slack distribution whose shape sub-set of paths is dependent on certain parameters yield, power, and timing. These are ideal goals. They may or may not be attainable, especially when combined with the over-all logic circuit synthesis.

The term "slack" mean the target cycle time minus the delay path.

Overview

This invention provides a mechanism for co-optimizing timing versus power versus yield by using a reference histogram as the timing target, rather than a single timing threshold.

The process is broken down into three major steps: 1) histogram creation, 2) analysis/comparison to reference histogram, and 3) optimization.

This invention provides a mechanism for identifying subsets of paths, referred to as path groups, as well as analyzing and optimizing each path group under a unique criteria. A unique reference histogram can be applied to each path group or a more conventional timing threshold target. Transparency, short path, array, timing for slew and slack is analyzed to enable different design constraints on different groups of paths.

Cumulative Histogram Background

Figure 1:
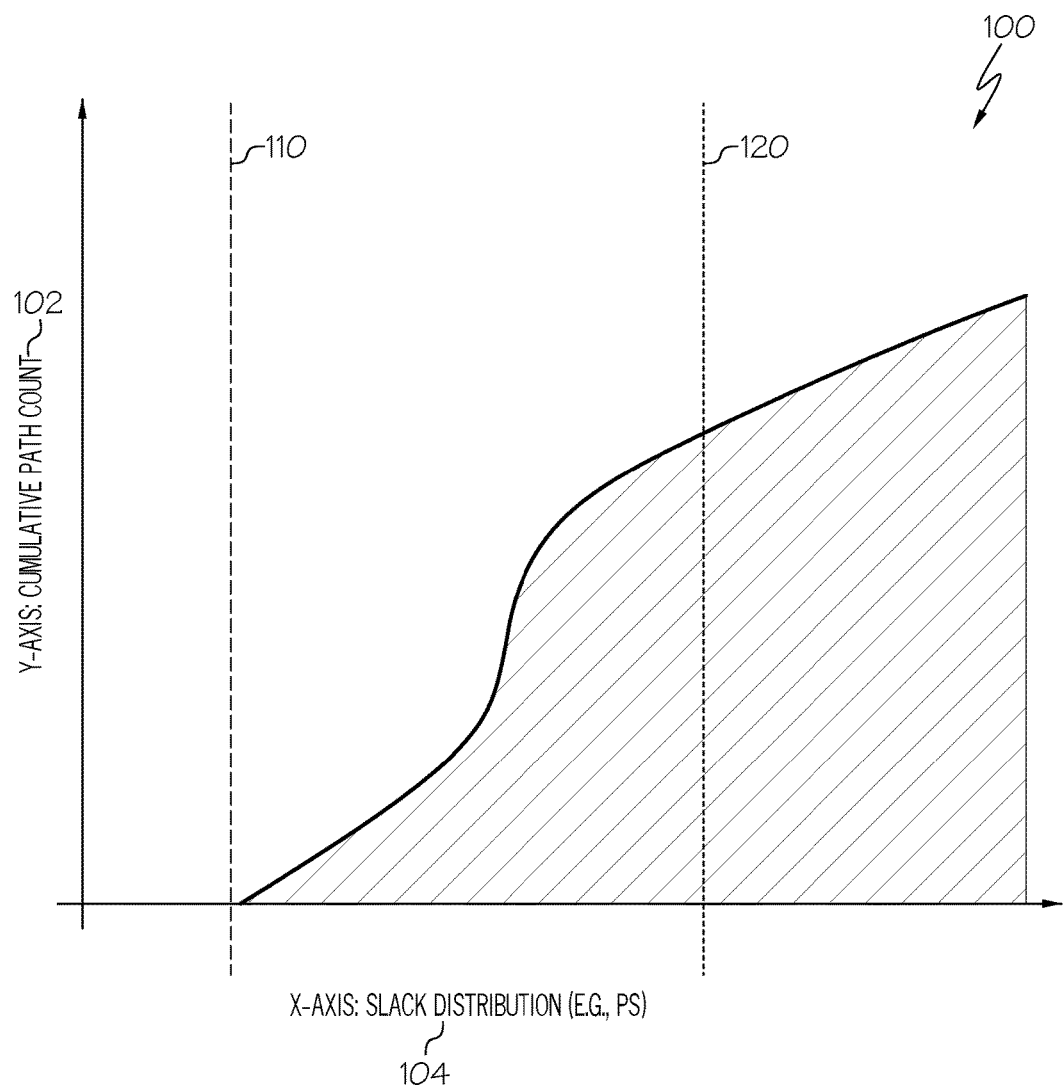
FIG. 1 is an example a cumulative histogram.

Turning to FIG. 1, shown is an example a cumulative histogram 100. The cumulative histogram 100 are common output from static timing tools, such as Cadence, Inc. These cumulative histograms relate the number of paths the equal or worst slack to a timing point. The term slack means:

$$slack = target\ cycle\ time - path\ delay$$

The y-axis 102 is cumulative path count with the number of paths less than or equal to slack value for the slack bin. The x-axis 104 is the slack distribution in pico seconds. The slack bins are created. The paths are assigned to a bin based on worst slack through the path.

Point 110 is the zero (0) slack point—paths to the left are negative, failing timing with respect to the target cycle time, paths to the right are positive. Point 120 is the slack threshold target–the optimization target is for slack is often >0 to account for process variation and slack measurement uncertainty.

Reference or Ideal Cumulative Histogram Comparison

Figure 2:
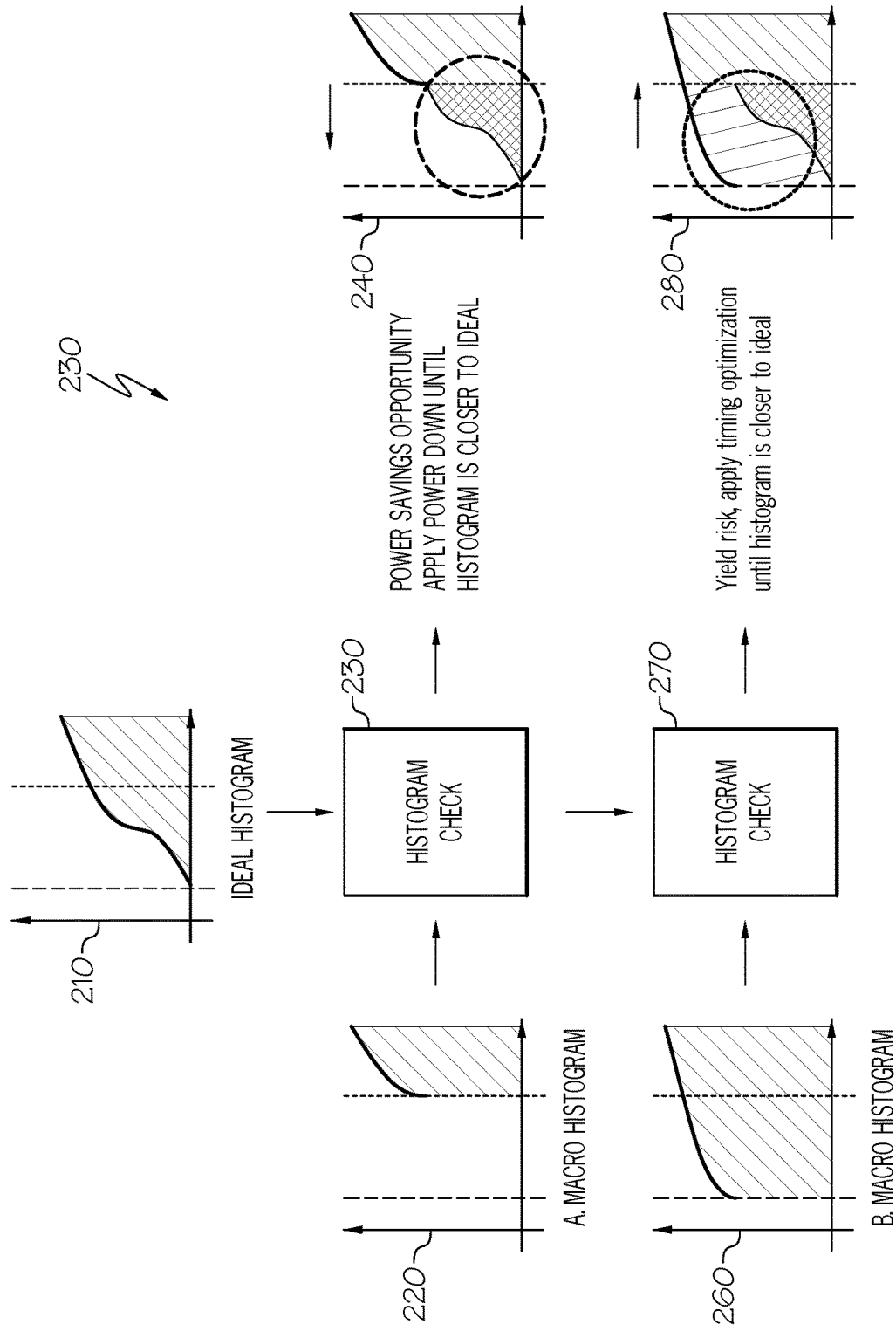
FIG. 2 is an example of an ideal histogram being compared against a cumulative histogram.

Turning to FIG. 2, shown is an example 200 of an ideal histogram 210 being compared against a cumulative histogram 220 and 260. In general pushing a cumulative histogram to the left gives more power recovery opportunity as shown using cumulative histogram A 220 with histogram comparison 230 and output 240. This process is repeated until the cumulative histogram 220 is closer to the ideal histogram 210. Whereas pushing the histogram to the right as shown in using cumulative histogram B 260 with histogram comparison 270 and output 280 requires more power but at the tradeoff of yield typically goes up. Again, this process is repeated until the cumulative histogram 260 is closer to the ideal histogram 210. The idea is to try to balances out power versus yield versus timing for a given type of group of paths, especially for larger and larger circuits.

Histogram Comparison Score

Figure 3:
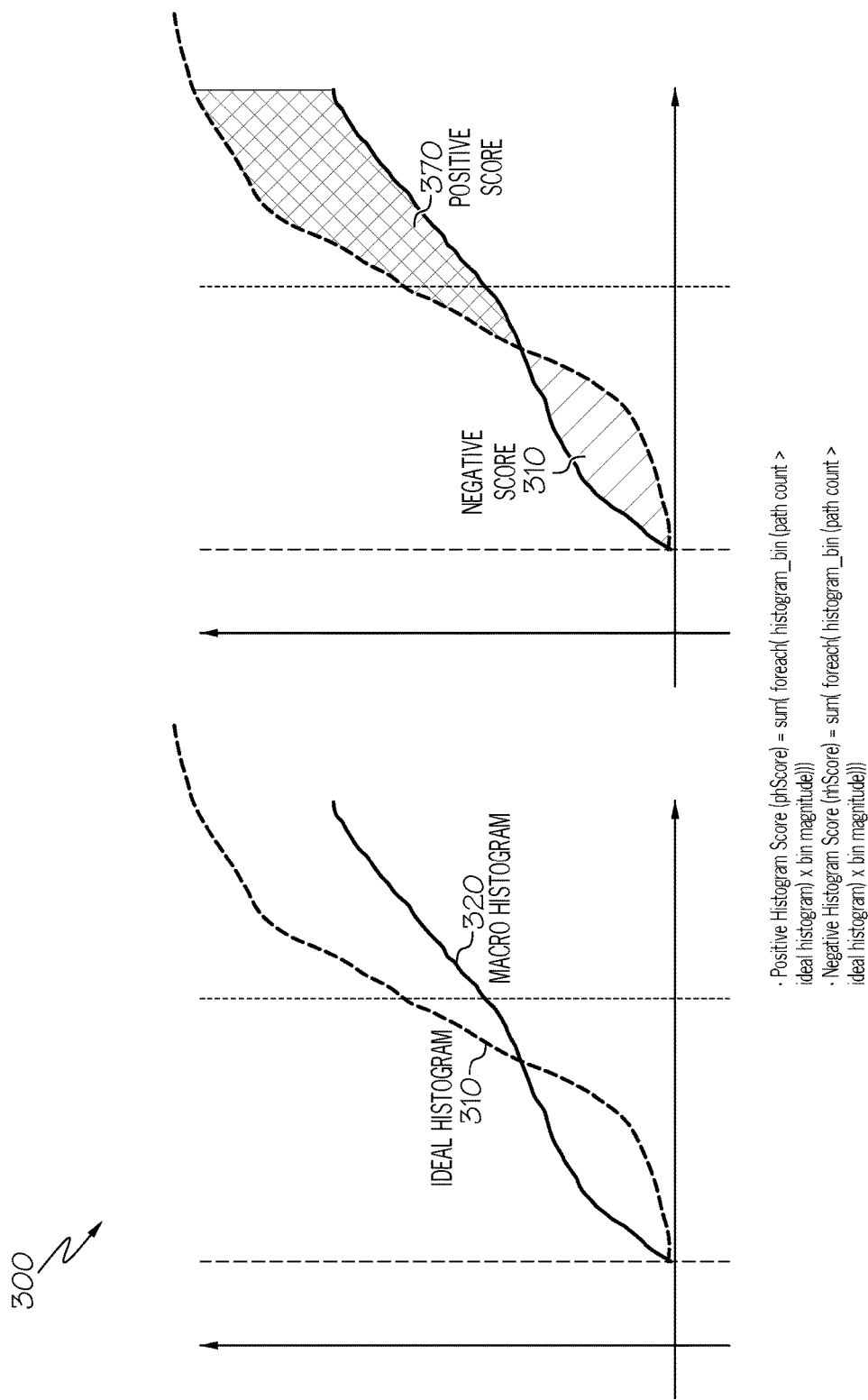
FIG. 3 is an example of an ideal cumulative histogram being compared against a macro histogram i.e. a cumulate cumulative histogram for a given set of paths.

Turning to FIG. 3, shown is an example 300 of an ideal cumulative histogram being compared against a macro histogram i.e. a cumulate cumulative histogram for a given set of paths. Calculated is both a negative histogram and an positive histogram. These are given by the example scoring equations:

Positive Histogram Score (phScore)=sum(foreach (histogram_bin(path count>ideal histogram)×bin magnitude)))

Negative Histogram Score (nhScore)=sum(foreach (histogram_bin(path count>ideal histogram)×bin magnitude)))

This allows comparing histograms for different scenarios for timing, power, and yield of circuit synthesis implementing the identical logic. There can be hundreds of different scenarios considered for circuit. These are all design choices or scenarios to compare. This use of unique optimizations can be applied to each type of path groups in a circuit design contains multiple types of paths within a single integrated circuit. This gives the designer a much more detailed understanding of a circuit.

A negative score is undesirable. It is typically more important to minimize or eliminate a negative score during circuit synthesis. The positive score represents power saving potential. For example downsize gates to recover power.

Synthesis Scenario Selection

Figure 4:
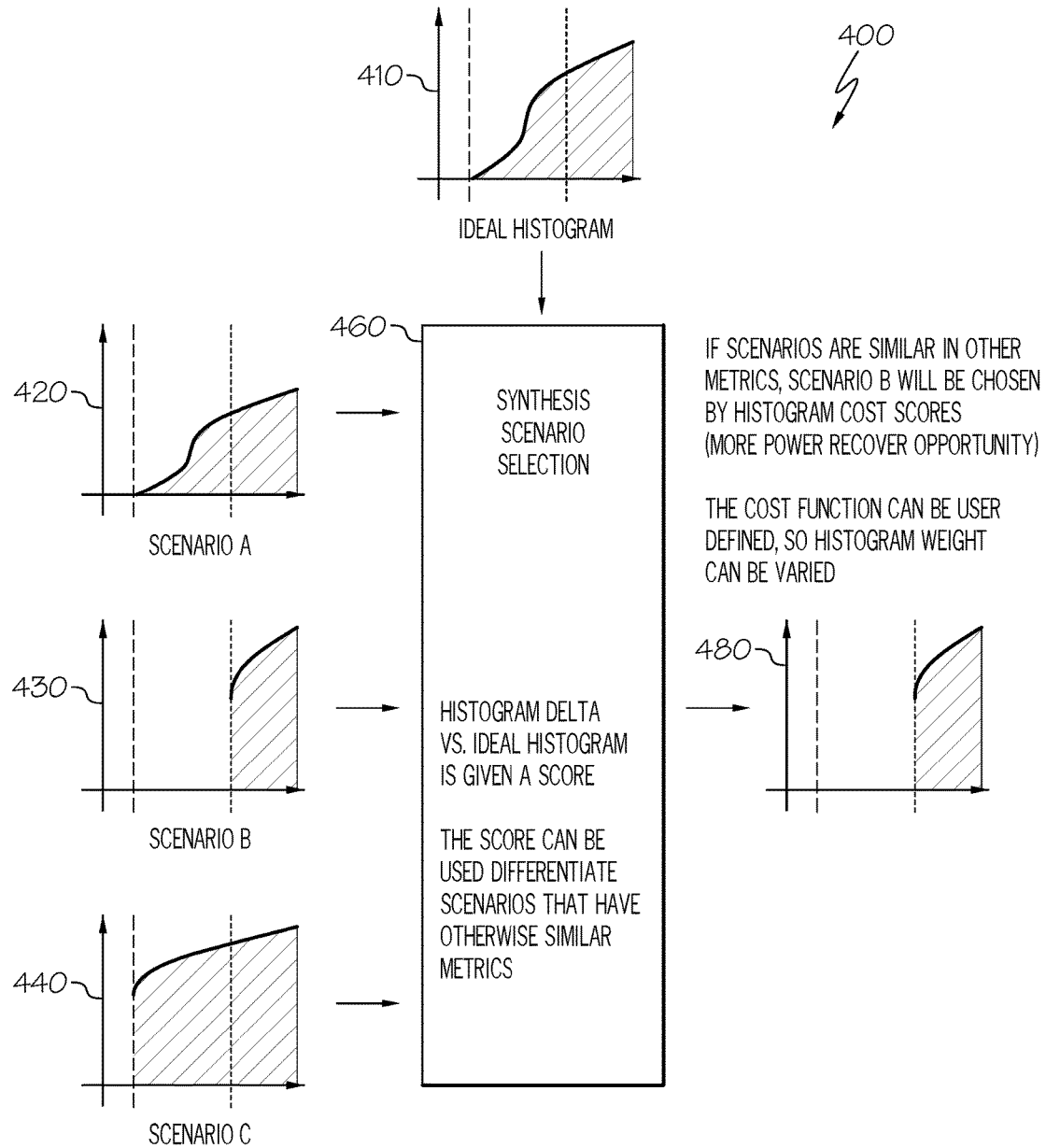
FIG. 4 is an example of an ideal cumulative histogram being compared against different histogram optimization design scenarios.

Turning to FIG. 4 shown is an example 400 of an ideal cumulative histogram being compared against different histogram optimization design scenarios. More specifically shown are three scenarios A 420, B 430, C 440 with synthesis selection scenario 460 and output 480. If all other metrics of interest of the similar or equivalent for the three scenarios, in this example scenario B 430 is selected because of the power recovery opportunity, which can be expressed by a positive delta histogram score using the process from FIG. 3. Although scenario A 420 is already similar to the ideal histogram, it is not selected and less favorable than B 430 because it would have effectively a zero histogram delta score, i.e., little power recovery opportunity. Scenario C 440 is not selected because the timing paths would be worse than the ideal histogram 410, hence it would have negative delta histogram score. In general, the exact selection criteria would be based on a user defined cost function that expresses the relative importance of power recovery (positive delta histogram score) and timing closure (negative delta histogram score).

It is important to note that matching exactly the ideal cumulative histogram is a goal. Many times this goal is not attainable. Rather the selected scenario is further optimized to correspond to the ideal histogram as much as possible.

EXPERIMENTAL RESULTS

Figure 5:
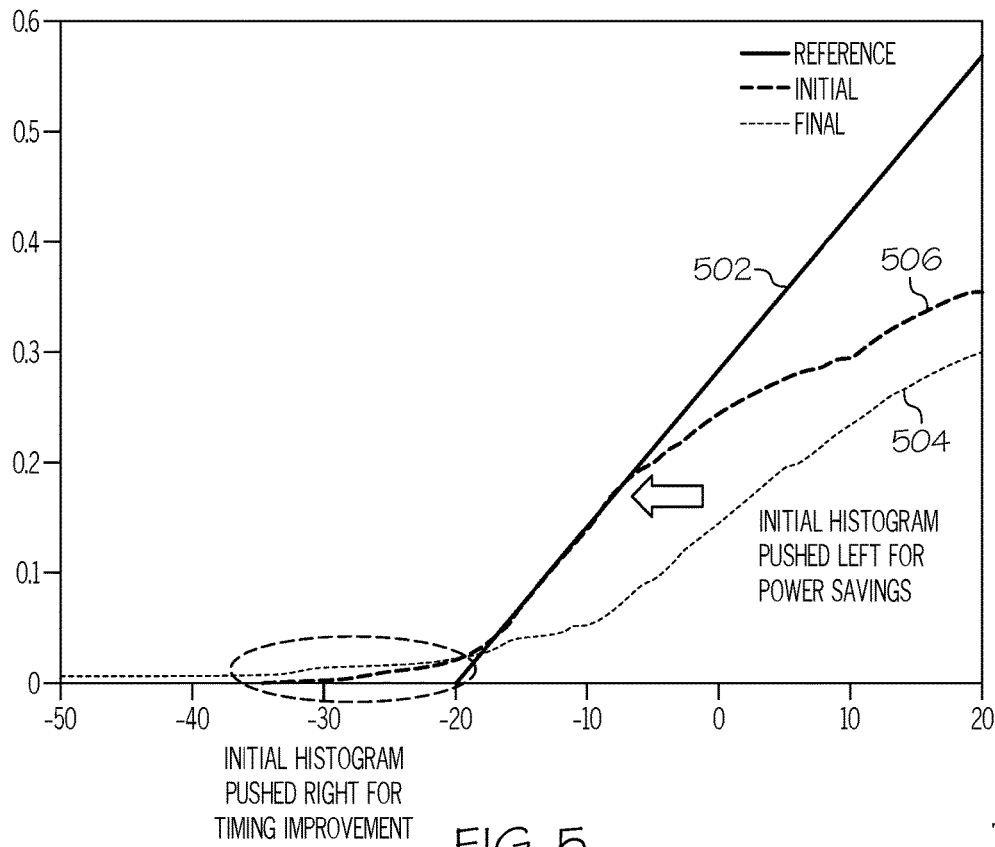
FIG. 5 is a graph illustrating the results of matching a reference cumulative histogram with a cumulative histogram for a group of paths.

FIG. 5 is a graph 500 illustrating results of matching an reference cumulative histogram with a cumulative histogram for a group of paths. A new analysis & optimization process could also be applied to each group of paths or path Group, based on comparing cumulative slack histogram to an ideal or/reference histogram. This proof of concept was completed using an International Business Machine Corporation (IBM) tool called eFinale, which is an extension to a tool provided by Cadence Inc.

Adjusting Histogram Optimization

Figure 6:
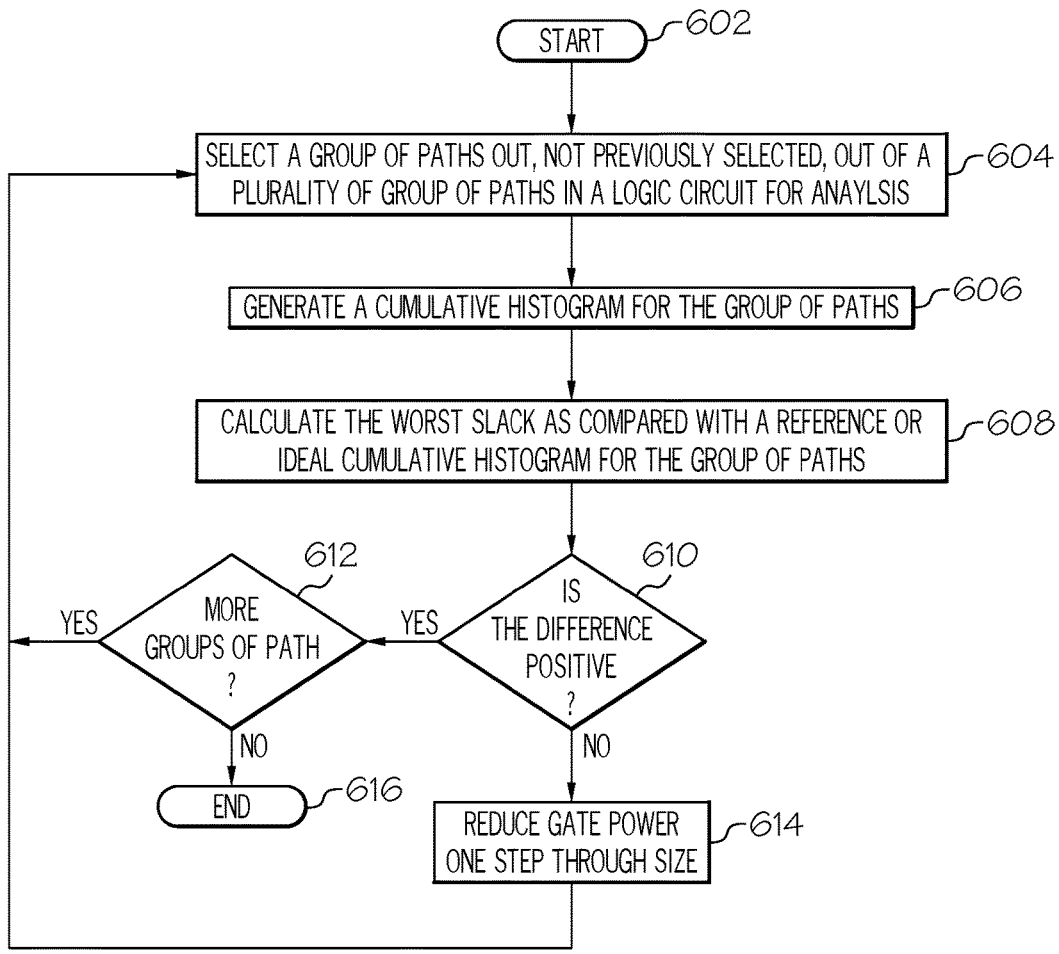
FIG. 6 is an example flow for adjusting the histogram optimization.

FIG. 6 is an example flow 600 for adjusting the histogram optimization. The process begins in step 602 and immediately proceeds to step 604. One of a group of paths or path group that has not been previously selected, in a group of paths for a logic circuit is selected. Next in step 606, a cumulative histogram is calculated for the group of paths that has been selected. In step 608 the worst slack is calculated through the path group. The difference between the current histogram and the referencet histogram at this slack point is calculated. A test is made in step 610, if the difference is positive continue to step 612. If more groups of paths are available the process continues up to step 604. Otherwise if no additional group of paths are available in step 612, the process ends in step 616.

In step 610, in the case the difference is negative or zero, the gate power is reduced one step size, or the voltage threshold is increased in step 614. The process continues back to step 604 as shown.

The algorithm continues processing all of the gates in the design until no further gate changes are observed. For timing optimization the algorithm increased the gate power through threshold voltage reduction and reverses the sign of the difference between the new histograms and the target histogram.

Using Statistical Timing Analysis and CLY

It is important to note that the present invention can be augmented with CLY (circuit-limited yield) prediction. This will allow the determination of CLY impact for changing an ideal histogram. The yield lost to variation of histogram can be determined.

For example, statistical timing analysis programs may be used to predict CLY of macros and/or entire chips. Alternatively, CLY predictions could be made by applying statistical variation estimates to an ideal histogram or histogram created from a non-statistical timing tool. The difference between these two approaches is whether variation is accounted for within the timing tool itself, i.e., statistical timing, or whether variation estimates are applied after the fact to a histogram created by a non-statistical timing tool. This disclosure proposes optimization techniques that allows tradeoffs in CLY predictions and power savings within a non-statistical timing framework. The same techniques for CLY and power tradeoffs could be extended to a statistical timing framework.

Still further, this generalized relationship could be reversed where an initial CLY target is given and an ideal histogram is construction that meets the CLY requirement but provides an attractive low power design point.

Delta Relationship for Changing an Ideal Histogram

Figure 7:
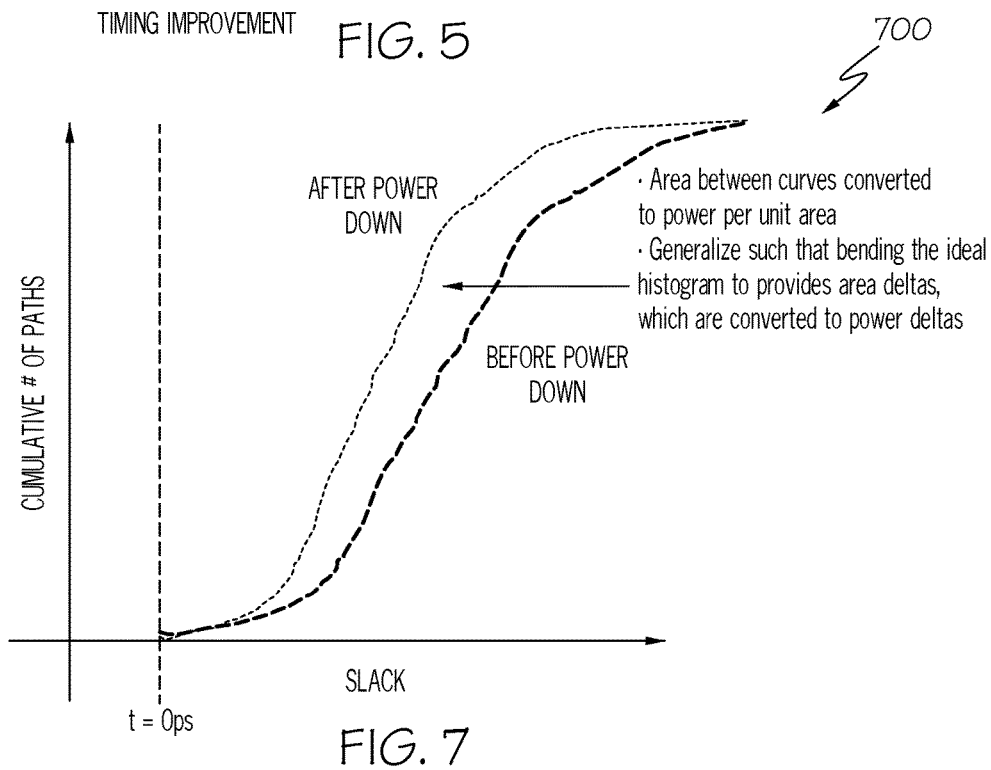
FIG. 7 is a curve to determine delta versus histogram delta relationship for changing an ideal histogram.

FIG. 7 is a curve 700 to determine delta versus histogram delta relationship for changing an ideal histogram. For example, a model to predict the power delta versus histogram area delta relationship for changing an ideal histogram could be constructed. Inherent to such a model is accounting for the power versus yield impacts. Such a model could be constructed based on running "unidirectional" power optimizations on all macros in a chip. Unidirectional power optimization refers to reducing voltage and/or reducing gate size only, such that each power savings move corresponds to the path slowing down. Area delta would be based on the composite of >200 macro histograms. After such a relationship is established, hypothetical ideal histogram changes can be converted to power delta estimates.

Area between curves converted to power per unit area. This is generalized, such that, bending the ideal histogram to provides area deltas, which are converted to power deltas. Everything is generally a tradeoff i.e. timing versus power versus yield.

Path Group Identification

Figure 8:
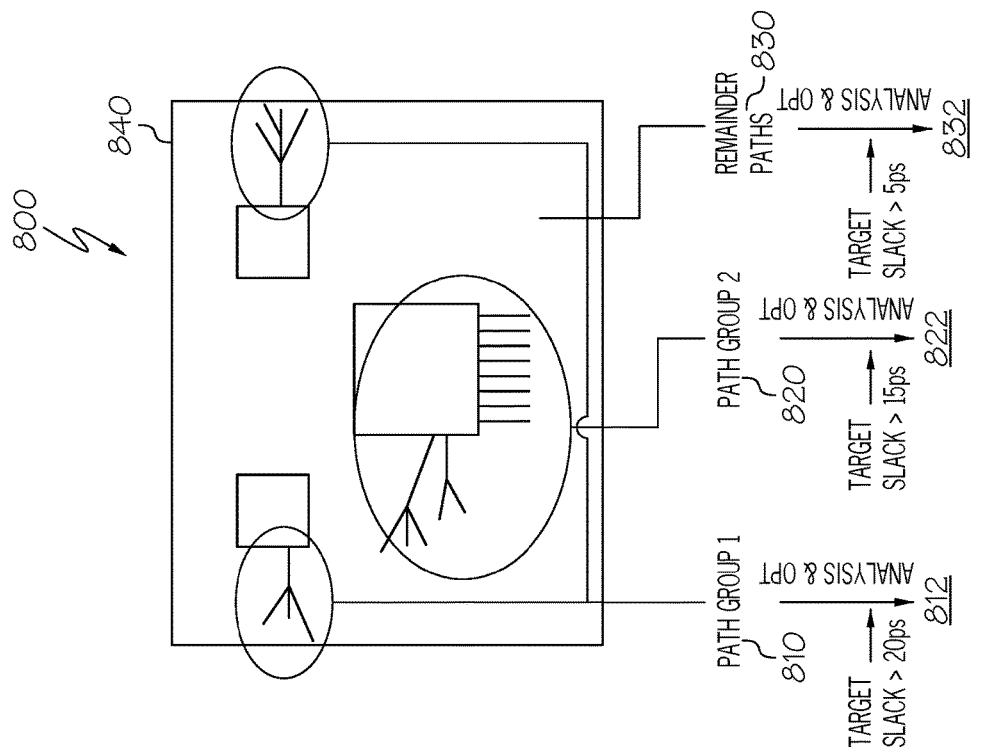
FIG. 8 is an example of path group identification.

FIG. 8 is an example of path group identification 800. The invention can be illustrated by considering the processing of three path groups consisting of the following signals: LCB (Local Clock Block) act signals 810, critical array signals 820, and the remainder of the paths 830. The LCB is a key component for clock distribution. An ACT signal is used to gate the clock. Typically, these types of signals only represent a small percentage of the overall circuit. A very aggressive ideal histogram is used for the LCB paths for timing purposes. This is path Group 1 812. This aggressive ideal histogram would be pushed to the right as much as possible. For example path Group I is shown as slack >20 ps. Even though the LCB paths are being pushed very hard in terms of timing, the power consumption is not greatly affected because these LCB paths make up such a small percentage of the overall circuit. Typically, LCB paths make up less than one percent of the overall circuit paths.

The critical array signals 820 is an array, such as register file or an SRAM array. The interface to these arrays need to be well controlled. The interface is a common point of failure. This Path Group II does not need to be as aggressive as Path Group I. For example, Path Group II is shown with slack >15 ps.

Now the two groups of very critical paths have been considered, the remaining paths 830 are grouped into Group III 832. For example, Path Group III is shown with slack >5 ps. This is not a strict as Group I and Group II. Overall, this grouping and optimization approach may lead to improved yield, since the timing critical Groups I and II have more aggressive timing targets, and also reduced power, since the majority of paths are Group III, which is non-critical in terms of timing and allows relaxation of the timing targets.

Figure 9:
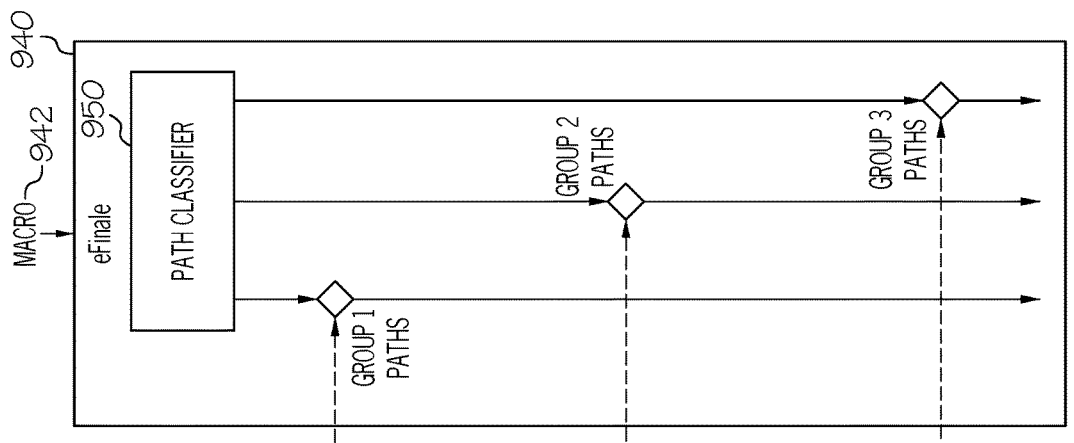
FIG. 9 is an example of multiple ideal histograms based on path types.

FIG. 9 is an example of multiple ideal histograms based on path types. In this example, three ideal histograms are used 910, 920, 930. These are applied based on an input 942 from the eFinale tool mentioned previously. A path classifier 950 is setup up. They are broken into three path groups Group I, Group II, Group III as shown.

An example path classifier 950 includes any combination of:
  Netlist regexp: e.g., net, cell/pin, inst/pin
  Topology regexp: e.g., celltype=INV, vt=SVT+ celltype=INV, vt=SVT+celltype=INV, vt=SVT
  Physical Structure: e.g., wire length>100 nm+layer<B1 and BHC<10 driving wire length>100 nm
  Inclusive, Exclusive matching
  Remainder of unmatched paths
  Contention Resolutions—when a path matches more than one Path Group
  Prioritize Path Groups and assign to higher priority Path Group
  Include path in all matching Path Groups Each path Group I, II, III receives individual analysis across the following criteria, both before and after optimization. The analysis includes any combination of:
  Netlist regexp: e.g., net, cell/pin, inst/pin
  Topology regexp: e.g., celltype=INV, vt=SVT+ celltype=INV, vt=SVT+celltype=INV,
  Timing: timing violations counts, endpoint reports, histogram analysis, etc.
  Power: summation of gate leakage and dynamic power attributed to gates in each Path Group—the intent is to provide a relative power contribution of each Path Group as well as provide a delta in power before and after optimization
  Delta Timing & Power analysis—shows the changes in timing & power for each Path Group
  Cumulative violation across all path Group I, II, III, as well as conventional analysis Optionally, histogram sculpting analysis is applied to each path Group I, II, III (and remainder) as well as a separate analysis across all gates, in addition to the analyses described above.

Applying Histogram Comparison at Many Points in the Design Process

Although the optimization techniques using cumulative histograms is described with reference to post-route optimization. It is important to note that the technique can be applied at many points during the design process as shown in FIG. 10. Techniques described can be applied as various steps of the design flow. Any step where timing histograms and gate-level netlists are available. Most common steps are during synthesis in which register transfer level (RTL) description is processed to place gates with estimated wires. Another step is post-route optimization where there is a final optimization pass of a routed circuit.

All paths in a macro may not have the same yield risks e.g., LCB act paths & paths connecting to arrays may be more likely to have hardware timing failures. Other paths may have low chance of variation or hardware timing fails. An ideal histogram can be created for each class of paths. Begin with path types that have historically caused hardware fails. Additional path groups can be defined later, e.g., during design for follow-on tapeouts after hardware from the initial tapeout is tested.

Computer Program Product Example

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for physically fabricating an electronic circuit using histogram optimization as part of a design process, the method comprising:
    a) identifying a plurality of groups of all paths in a circuit by unique criteria, the unique criteria being any of a netlist regular expression, a cell topology regular expression, a physical structure, or a combination thereof;
    b) selecting at least one group subset of paths from the plurality of groups of all paths for analysis;
    c) generating a cumulative histogram for the group subset of paths that have been selected, the cumulative histogram including a cumulative path count versus a slack distribution;
    d) generating a similarity score by comparing the cumulative path count versus the slack distribution of the cumulative histogram to a cumulative path count versus a slack distribution of a reference cumulative histogram for the group subset of paths that have been selected;

e) adjusting a histogram optimization on the group subset of paths that have been selected to make the cumulative histogram correspond to the reference cumulative histogram maximize the similarity score;

repeating steps d and e until the cumulative histogram corresponds to the reference cumulative histogram within a threshold; and physically fabricating, with a computer, at least one electronic circuit based on the group subset of paths that have been selected.

2. The method of claim 1, wherein the adjusting a histogram optimization on the group subset of paths to make the cumulative histogram correspond to the reference cumulative histogram includes making the cumulative histogram better than the reference cumulative histogram in terms of at least one of timing, power, yield, or a combination thereof.

3. The method of claim 1, further comprising:

selecting an additional group subset of paths from the plurality of the groups of all paths for analysis and performing steps c through e with the additional group subset of paths in place of the group subset of paths that have been selected; and merging the histogram optimization performed on each group subset of paths from the plurality of the groups of all paths into overall histogram optimization design.

4. The method of claim 1, wherein the unique criteria for the group subset of paths includes:

timing criteria with timing violations counts, endpoint reports of path delays represented as gates and wire component delays, and timing histogram analysis attributed to gates in each the group subset of paths in order to provide both a relative power contribution of each the group subset of paths and a delta in power before and after adjusting the histogram optimization.

5. The method of claim 1, wherein the unique criteria for the group subset of paths includes:

yield criteria with a conversion of a timing histogram to a yield metric attributed to gates in each group subset of paths in order to provide both a relative power contribution of each group subset of paths and a delta in power before and after adjusting the histogram optimization.

6. The method of claim 1, wherein the unique criteria for the group subset of paths includes:

power criteria with a summation of gate leakage and dynamic power attributed to gates in each the group subset of paths in order to provide both a relative power contribution of each the group subset of paths and a delta in power before and after adjusting the histogram optimization.

7. The method of claim 1, wherein the unique criteria for the group subset of paths includes:

cumulative violations across all the group subset of paths in the plurality of groups of all paths.

8. The method of claim 1, wherein the selecting at least one group subset of paths from the plurality of groups of all paths for analysis further comprises selecting the at least one group subset of paths from multiple design scenarios by ranking the multiple design scenarios based on a comparison of the cumulative histograms of the multiple design scenarios to a reference cumulative histogram.

9. A system for physically fabricating an electronic circuit using histogram optimization as part of a design, the system comprising:

a memory;

a processor communicatively coupled to the memory, where the processor is configured to perform a) identifying a plurality of groups of all paths in a circuit by unique criteria, the unique criteria being any of a netlist regular expression, a cell topology regular expression, a physical structure, or a combination thereof;

b) selecting at least one group subset of paths from the plurality of groups of all paths for analysis;

c) generating a cumulative histogram for the group subset of paths that have been selected, the cumulative histogram including a cumulative path count versus a slack distribution;

d) generating a similarity score by comparing the cumulative path count versus the slack distribution of the cumulative histogram to a cumulative path count versus a slack distribution of a reference cumulative histogram for the group subset of paths that have been selected;

e) adjusting a histogram optimization on the group subset of paths that have been selected to make the cumulative histogram correspond to the reference cumulative histogram maximize the similarity score;

repeating steps d and e until the cumulative histogram corresponds to the reference cumulative histogram within a threshold; and physically fabricating, with a computer, at least one electronic circuit based on the group subset of paths that have been selected.

10. The system of claim 9, wherein the adjusting a histogram optimization on the group subset of paths to make the cumulative histogram correspond to the reference cumulative histogram includes making the cumulative histogram better than the reference cumulative histogram in terms of at least one of timing, power, yield, or a combination thereof.

11. The system of claim 9, further comprising:

selecting an additional group subset of paths from the plurality of the groups of all paths for analysis and performing steps c through e with the additional group subset of paths in place of the group subset of paths that have been selected; and merging the histogram optimization performed on each group subset of paths from the plurality of the group subset of paths into overall histogram optimization design.

12. The system of claim 9, wherein the unique criteria for the group subset of paths includes:

timing criteria with timing violations counts, endpoint reports of path delays represented as gates and wire component delays, and timing histogram analysis attributed to gates in each the group subset of paths in order to provide both a relative power contribution of each the group subset of paths and a delta in power before and after adjusting the histogram optimization.

13. The system of claim 9, wherein the unique criteria for the group subset of paths includes:

yield criteria with a conversion of a timing histogram to a yield metric attributed to gates in each group subset of paths in order to provide both a relative power contribution of each group subset of paths and a delta in power before and after adjusting the histogram optimization.

14. The system of claim 9, wherein the unique criteria for the group subset of paths includes:

power criteria with a summation of gate leakage and dynamic power attributed to gates in each the group subset of paths in order to provide both a relative power contribution of each the group subset of paths and a delta in power before and after adjusting the histogram optimization.

15. The system of claim 9, wherein the unique criteria for the group subset of paths includes:
 cumulative violations across all group subset of paths in the plurality of groups of all paths.

16. The system of claim 9, wherein the selecting at least one group subset of paths from the plurality of groups of all paths for analysis further comprises selecting the at least one group subset of paths from multiple design scenarios by ranking the multiple design scenarios based on a comparison of the cumulative histograms of the multiple design scenarios to a reference cumulative histogram.

17. A computer program product for physically fabricating an electronic circuit using histogram optimization as part of a design process, the computer program product comprising a non-transitory computer readable storage medium having program instructions embodied therewith, the program instructions executable by a computer to cause the computer to:
 a) identifying a plurality of groups of all paths in a circuit by unique criteria, the unique criteria being any of a netlist regular expression, a cell topology regular expression, a physical structure, or a combination thereof;
 b) selecting at least one group subset of paths from the plurality of groups of all paths for analysis;
 c) generating a cumulative histogram for the group subset of paths that have been selected, the cumulative histogram including a cumulative path count versus a slack distribution;
 d) generating a similarity score by comparing the cumulative path count versus the slack distribution of the cumulative histogram to a cumulative path count versus a slack distribution of a reference cumulative histogram for the group subset of paths that have been selected;
 e) adjusting a histogram optimization on the group subset of paths that have been selected to make the cumulative histogram correspond to the reference cumulative histogram maximize the similarity score;
 repeating steps d and e until the cumulative histogram corresponds to the reference cumulative histogram within a threshold; and
 physically fabricating, with a computer, at least one electronic circuit based on the group subset of paths that have been selected.

18. A computer program product of claim 17, further comprising:
 selecting an additional subset of paths from all paths for analysis and performing steps c through e with the additional subset of paths in place of the subset of paths that have been selected; and
 merging the histogram optimization performed on each subset of paths from all paths into overall histogram optimization design.

\* \* \* \* \*